United States Patent
Brenner et al.

(10) Patent No.: US 7,080,379 B2
(45) Date of Patent: Jul. 18, 2006

(54) MULTIPROCESSOR LOAD BALANCING SYSTEM FOR PRIORITIZING THREADS AND ASSIGNING THREADS INTO ONE OF A PLURALITY OF RUN QUEUES BASED ON A PRIORITY BAND AND A CURRENT LOAD OF THE RUN QUEUE

(75) Inventors: Larry Bert Brenner, Austin, TX (US); Dean Joseph Burdick, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 740 days.

(21) Appl. No.: 10/177,410

(22) Filed: Jun. 20, 2002

(65) Prior Publication Data

US 2003/0236815 A1 Dec. 25, 2003

(51) Int. Cl.
*G06F 9/46* (2006.01)

(52) U.S. Cl. ...................... 718/105; 718/100; 718/102; 718/103; 718/104

(58) Field of Classification Search ........ 718/100–104, 718/105
See application file for complete search history.

(56) References Cited

U.S. PATENT DOCUMENTS

| | | | | |
|---|---|---|---|---|
| 5,680,539 | A | * | 10/1997 | Jones ............................. 714/6 |
| 5,774,668 | A | * | 6/1998 | Choquier et al. ........... 709/223 |
| 6,105,053 | A | * | 8/2000 | Kimmel et al. ............. 718/105 |
| 6,289,369 | B1 | * | 9/2001 | Sundaresan ................. 718/103 |

FOREIGN PATENT DOCUMENTS

| | | |
|---|---|---|
| JP | 07-282013 | 10/1995 |
| JP | 2002-063148 | 2/2002 |

OTHER PUBLICATIONS

Saito et al., JPO Machine Translation of JP Pub. No. 07-282013 (Oct. 1995).*
Brenner et al., JPO Machine Translation of JP Pub. No. 2002-063148 (Feb. 2002).*

* cited by examiner

*Primary Examiner*—Meng-Al T. An
*Assistant Examiner*—Syed J Ali
(74) *Attorney, Agent, or Firm*—Volel Emile; Mark E. McBurney (57) ABSTRACT

A method, system and apparatus for integrating a system task scheduler with a workload manager are provided. The scheduler is used to assign default priorities to threads and to place the threads into run queues and the workload manager is used to implement policies set by a system administrator. One of the policies may be to have different classes of threads get different percentages of a system's CPU time. This policy can be reliably achieved if threads from a plurality of classes are spread as uniformly as possible among the run queues. To do so, the threads are organized in classes. Each class is associated with a priority as per a use-policy. This priority is used to modify the scheduling priority assigned to each thread in the class as well as to determine in which band or range of priority the threads fall. Then periodically, it is determined whether the number of threads in a band in a run queue exceeds the number of threads in the band in another run queue by more than a pre-determined number. If so, the system is deemed to be load-imbalanced. If not, the system is load-balanced by moving one thread in the band from the run queue with the greater number of threads to the run queue with the lower number of threads.

28 Claims, 8 Drawing Sheets

| DEPARTMENTS | USER | USE PERCENTAGES | CLASSES | PRIORITIES |
|---|---|---|---|---|
| PHYSICS 400 | USER$_1$ USER$_2$ USER$_3$ ... | 60 (402) | A | 30 |
| CHEMISTRY 410 | USER$_1$ USER$_2$ USER$_3$ ... | 30 (412) | B | 20 |
| MATH 420 | USER$_1$ USER$_2$ USER$_3$ ... (422) | 10 | C | 10 |

MULTIPROCESSOR LOAD BALANCING SYSTEM FOR PRIORITIZING THREADS AND ASSIGNING THREADS INTO ONE OF A PLURALITY OF RUN QUEUES BASED ON A PRIORITY BAND AND A CURRENT LOAD OF THE RUN QUEUE

BACKGROUND OF THE INVENTION

1. Technical Field

The present invention is directed to resource allocations in a computer system. More specifically, the present invention is directed to a method and apparatus of load balancing resources of a computer system in accordance with certain constraints or use-policies set by a system administrator.

2. Description of Related Art

At any given processing time, there may be a multiplicity of user processes or threads waiting to be executed on a processor or CPU of a computing system. To best utilize the CPU of the system then, it is necessary that an efficient mechanism that properly queues the processes or threads for execution be used. The mechanism used by most computer systems to accomplish this task is a scheduler.

Note that a process is a program. When a program is executing, it is loosely referred to as a task. In most operating systems, there is a one-to-one relationship between a task and a program. However, some operating systems allow a program to be divided into multiple tasks or threads. Such systems are called multithreaded operating systems. For the purpose of simplicity, threads and processes will henceforth be used interchangeably.

A scheduler is a software program that coordinates the use of a computer system's shared resources (e.g., a CPU). The scheduler usually uses an algorithm such as a first-in, first-out (i.e., FIFO), round robin or last-in, first-out (LIFO), a priority queue, a tree etc. algorithm or a combination of a plurality of algorithms in doing so. Basically, if a computer system has three CPUs ($CPU_1$, $CPU_2$ and $CPU_3$), each CPU will accordingly have a ready-to-be-processed queue or run queue. If the algorithm in use to assign processes to the run queue is the round robin algorithm and if the last process created was assigned to the queue associated with $CPU_2$, then the next process created will be assigned to the queue of $CPU_3$. The next created process will then be assigned to the queue associated with $CPU_1$ and so on. Thus, schedulers are designed to give each process a fair share of a computer system's resources.

Sometimes a system administrator may want different processes to receive a different share of a resource. In that case, a workload manager (WLM) is used in conjunction with the scheduler. The WLM assigns a number representing a percentage of time a process may use a resource of a computer system to each process. Each time a process uses the resource, its assigned number is reduced. This scheme allows processes that have a lower assigned number to nonetheless use the resource.

In some instances, this concept is applied to classes of processes. A class of processes, in this case, may be a group of processes that belongs to a particular group of users. Thus, just as in the case where a process is assigned a number, when processes of a class are using the resource, the number assigned to the class is reduced. Again, this scheme is used to ascertain that processes in classes with a lower assigned number do have opportunities to use the resource.

The problem, however, is that at times a two-processor system with, for instance, two classes of processes each having a different assigned number may end up with one processor with one class of processes in its queue while the other processor with the other class of processes in its queue. When this occurs, the two processors of the computer system may not be used as efficiently as they could be or as a system administrator may have intended them to be. Specifically, processes in one run queue will receive more processing time than they are allowed to.

Thus, what is needed is a system, apparatus and method of ascertaining that each queue of a system always contains a mixture of classes of processes, each one having a different assigned number, in order to ensure that processor use-policies established by a system administrator are adhered to.

SUMMARY OF THE INVENTION

The present invention provides a method, system and apparatus for integrating a system task scheduler with a workload manager. The scheduler is used to assign default priorities to threads and to place the threads into run queues and the workload manager is used to implement policies set by a system administrator. One of the policies may be to have different classes of threads get different percentages of a system's CPU time. This policy can be reliably achieved if threads from a plurality of classes are spread as uniformly as possible among the run queues.

In a particular embodiment, the threads are organized in classes, each class being made up of a group of related threads. Each class is associated with a priority as per a use-policy. This priority is used to modify the scheduling priority assigned to each thread in the class. Depending on the value of the class priority, the class, and therefore each thread in the class, may fall into one of a plurality of bands or ranges of priority. Periodically, the invention determines whether the number of threads in a band in a run queue exceeds the number of threads in the band in another run queue by more than a pre-determined number. If so, the system is deemed to be load-imbalanced. The invention then attempts to load-balance the system by moving one thread in the band from the run queue with the greater number of threads to the run queue with the lower number of threads. If the system is load balanced at the highest priority band, the invention will check to see whether the system is load-balanced at the next highest priority band and so on.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
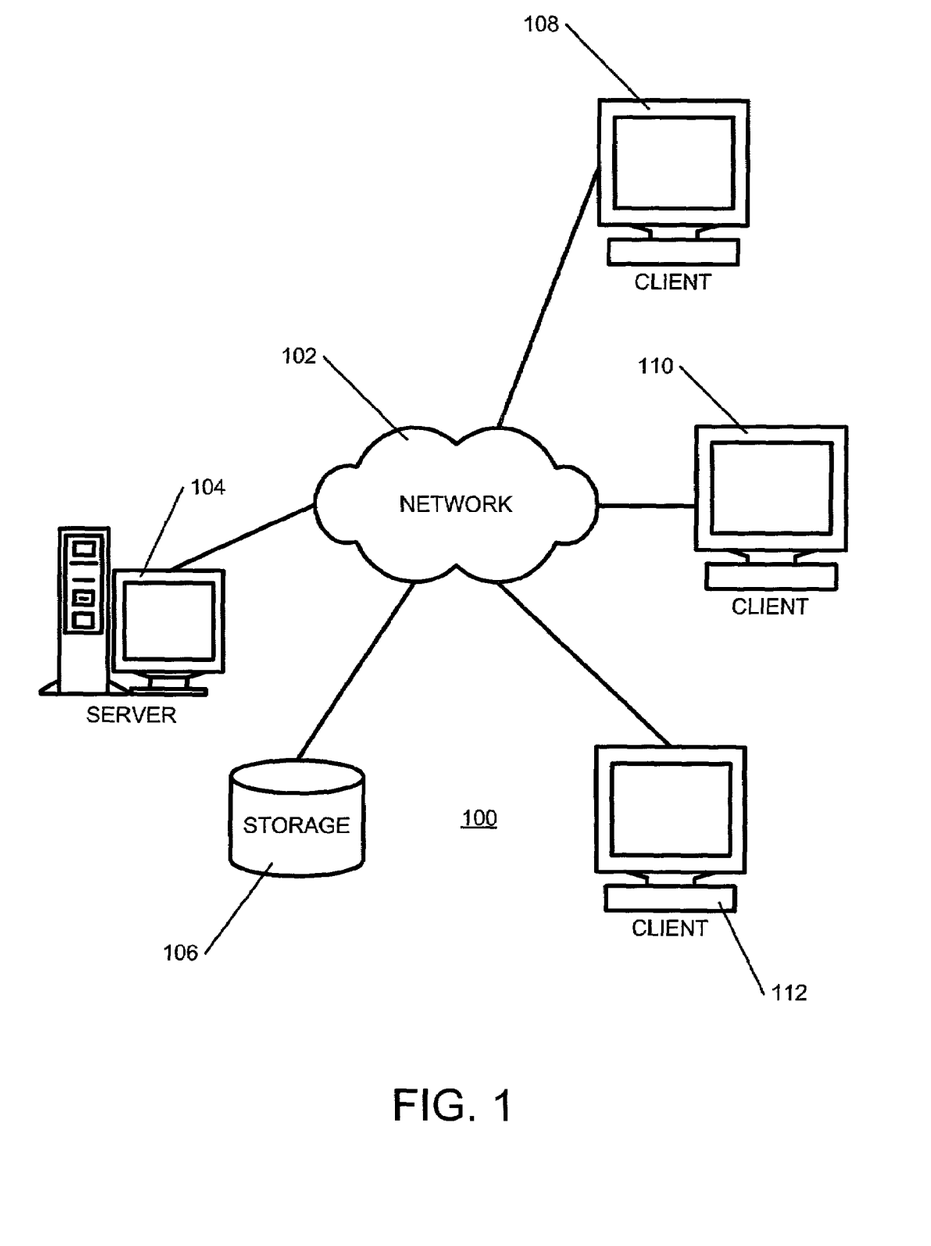
FIG. 1 is an exemplary block diagram illustrating a distributed data processing system according to the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108, 110 and 112. Clients 108, 110 and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
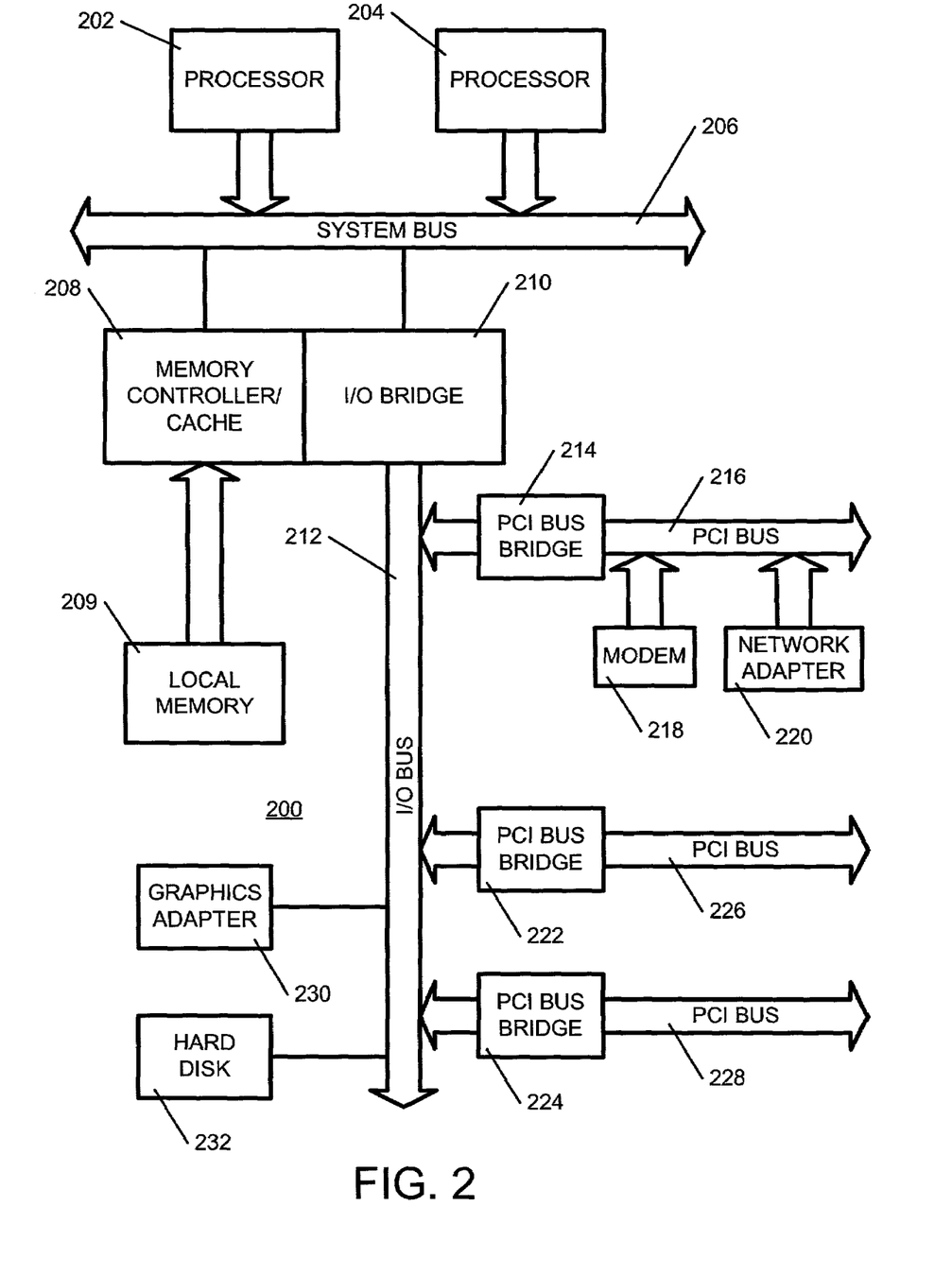
FIG. 2 is an exemplary block diagram of a server apparatus according to the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
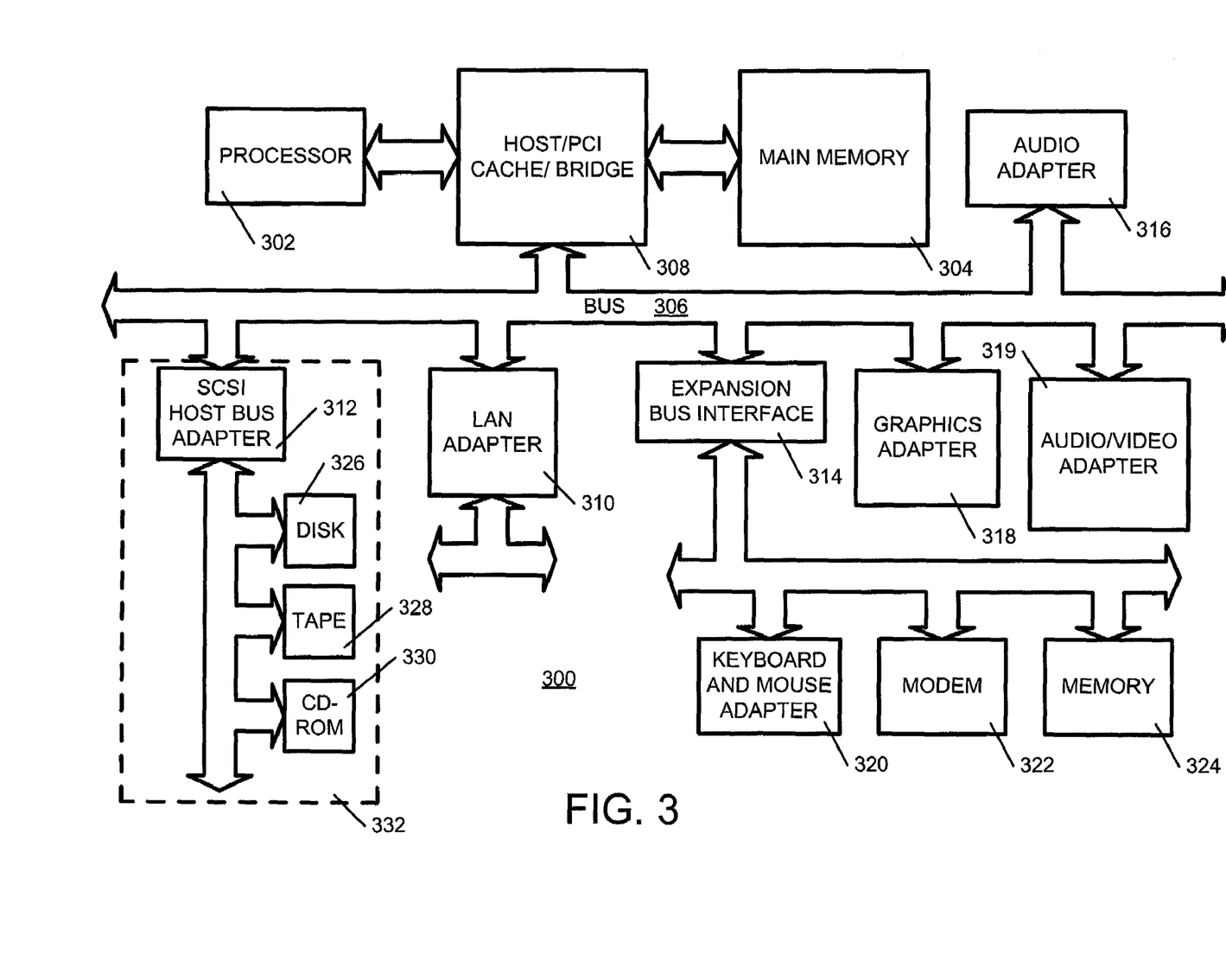
FIG. 3 is an exemplary block diagram of a client apparatus according to the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 may also be a notebook computer or hand held computer in addition to taking the form of a PDA. Data processing system 300 also may be a kiosk or a Web appliance.

The present invention provides an apparatus, system and method of ascertaining that each run queue of a multiprocessor system contains processes of different classes of threads, each class having a different priority number, thus ascertaining that established use-policies are complied with. The invention may be local to client systems 108, 110 and 112 of FIG. 1 or to the server 104 or to both the server 104 and clients 108, 110 and 112. Consequently, the present invention may reside on any data storage medium (i.e., floppy disk, compact disk, hard disk, ROM, RAM, etc.) used by a computer system.

Figure 4A:
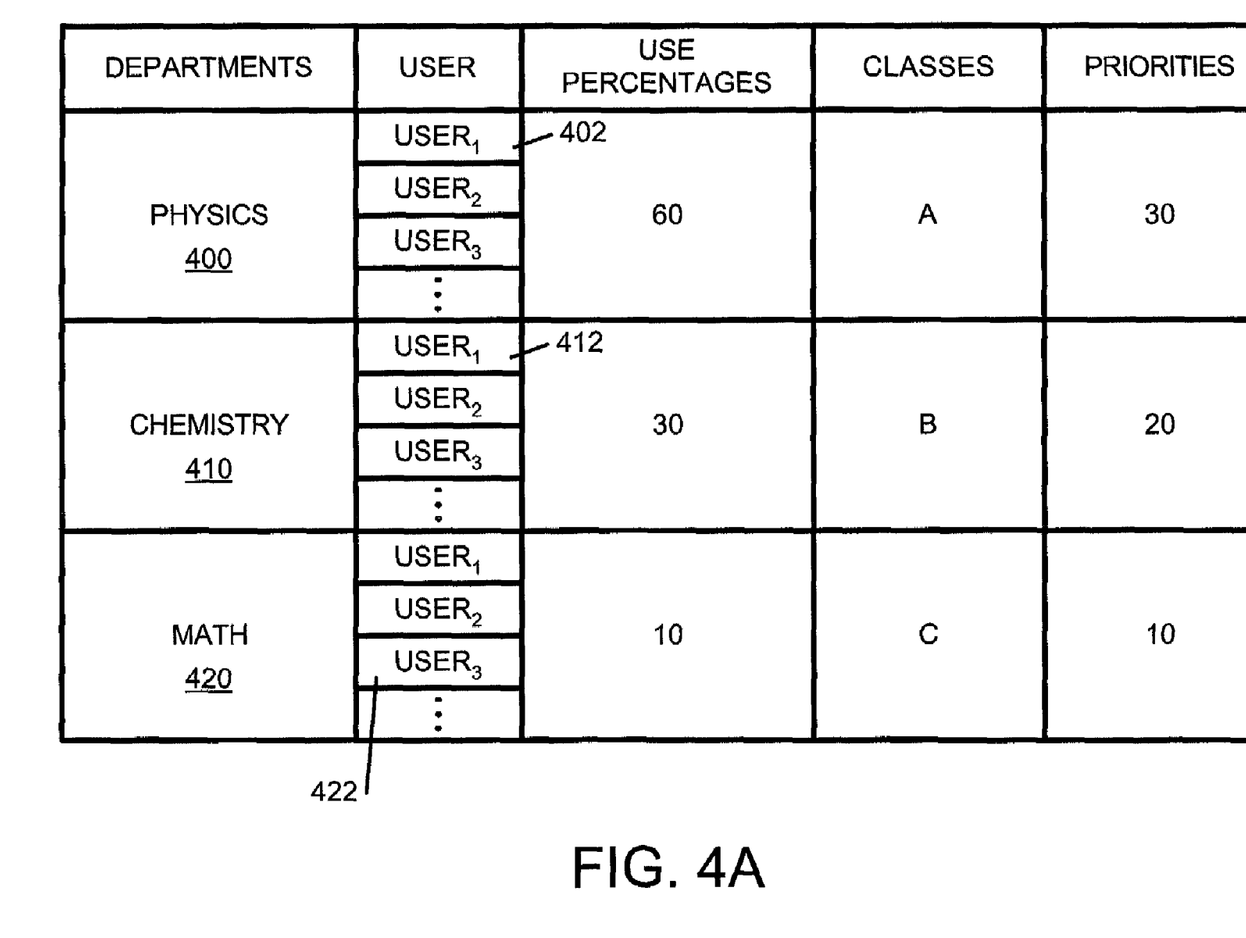
FIG. 4 illustrates a resource-use-policy that may be devised by a system administrator.

FIG. 4 illustrates a resource-use-policy that may be devised by a system administrator. As shown in FIG. 4A, the resource-use-policy is developed for a computer system (e.g., a server) that is to be shared by three departments at a University (i.e., the Physics, Chemistry and Math Departments). According to the policy, users 400 of the Physics Department 400 are to receive 60% of the computer system's CPU time, users 412 of the Chemistry Department 410 are to receive 40% of the computer system's CPU time and users 422 of the Math Department are to receive 10%. To distinguish each group of threads from another, they are tagged as being classes. Specifically, threads belonging to users of the Physics Department are tagged as being in class A, those belonging to the users of the Chemistry Department in class B and those belonging to the users of the Math Department in class C.

Figure 4B:
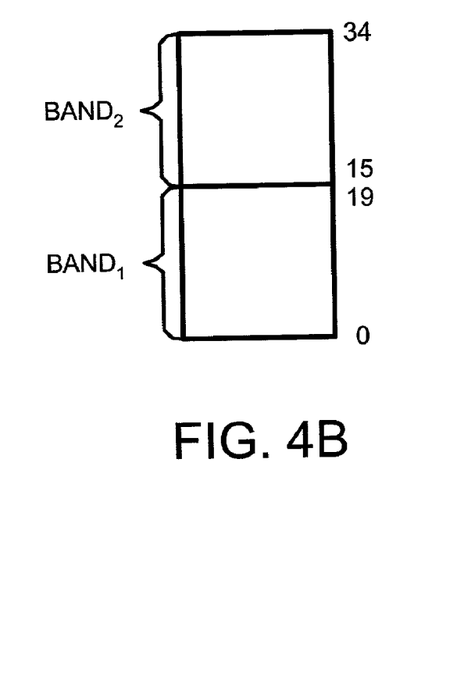

An adjunct to the resource-use-policy is a band distribution policy. This distribution policy is depicted in FIG. 4B. There, two bands are displayed, $band_1$ and $band_2$. This distribution policy categorizes all classes that have a priority between 0–14 as being in $band_1$ and all classes whose priority falls within 15–30 in $band_2$. Thus, a freshly created thread belonging to a user from the Math Department will fall into $band_1$, whereas one belonging to a user from either the Physics or the Chemistry Department will fall into $band_2$.

As in the prior art, each generated thread has a default priority. This default priority is the same for all threads. However, when the thread is placed in the run queue, its priority is adjusted in accordance with its class. For example, 30 will be added to the default priority of a class A thread. Likewise, 20 will be added to the default priority of a class B thread and 10 will be added to the default priority of a class C thread. Thus, the total priority of a thread in a run queue is: $P_{Total} = P_{Default} + P_{class}$.

Figure 5:
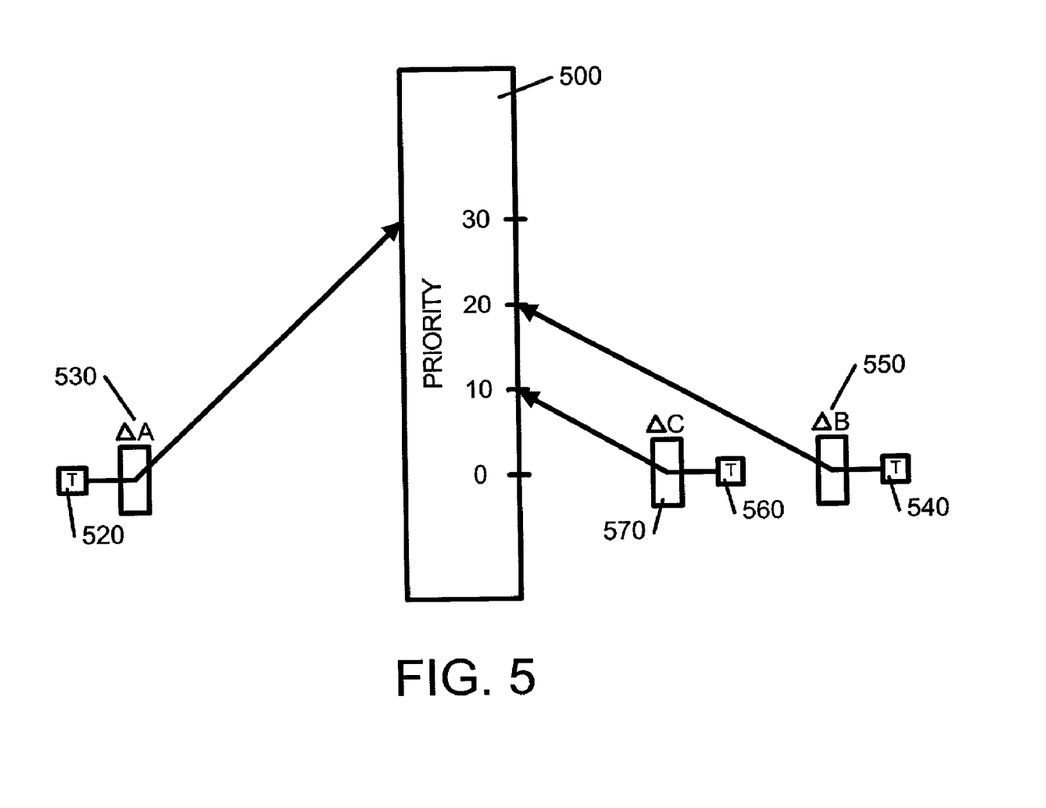
FIG. 5 illustrates how a class priority affects a thread in a run queue.

FIG. 5 illustrates how a class priority affects a thread in a run queue. In FIG. 5, a priority space 500 of a processor is divided into priority numbers 0, 10, 20 and 30. A class A thread 520, a class B thread 540 and a class C thread 560 are also displayed. $P_{Default}$ of a thread is given a value of zero (0). Thus, all the threads start at the same priority level of zero (0). A priority delta $\Delta A$ 530 of 30 is added to the class A thread, a priority delta $\Delta B$ 550 of 20 is added to the class B thread and a priority delta $\Delta C$ 570 of 10 is added to the class C thread. Thus, the processor will favor a class A thread over a class B thread. Likewise, the processor will favor a class B thread over a class C thread.

In the prior art, as a thread is being processed, its priority is also being reduced. This scheme allows all threads in a run queue to fairly compete for the processor's attention. The same scheme is also used in the present invention. That is, as a thread is being processed its $P_{total}$ will be reduced. This allows threads within a class to fairly compete with each other. In addition, as a class of threads is being processed, the class priority will likewise be reduced. For example, since class A threads have higher class priority than class B threads and class C threads, class A threads will be processed before the other two. But, as the class A threads are being processed, the class A priority of 30 will be reduced until it reaches 20 or below. At that point, both class A and class B threads will be processed. The priority of both classes will be reduced until it reaches 10 or below at which time the threads in all three classes will be processed.

As the class priority is being reduced, the class may go from one band to another. Thus, the class priority may be regarded as being very fluent. The priority decreases when the threads of the class are being processed and increases when the threads are not being processed as much as indicated in the use-policy.

FIG. 6 illustrates run queues of a shared computer system. It is assumed that the computer system has two CPUs and two run queues, each run queue being associated with a CPU (i.e., $CPU_0$ 600 and $CPU_1$ 650). It is also assumed that the priority delta of each class is already added to the threads. Three classes of threads are present in the system. Specifically, the run queue associated with $CPU_0$ 600 contains threads from both class A 610 and class B 620. The run queue associated with $CPU_1$ contains threads from class C 630.

In operation, when a thread is created, the workload manager determines the class of the thread based on the user to whom it belongs and the scheduler places the thread into a run queue using a placement algorithm (e.g., round robin). As threads are processed out of the run queues and new threads are placed into the run queues, there may be instances when the threads are distributed into the system as shown in FIG. 6.

The distribution of the threads in FIG. 6 is not ideal as the use-policy (see FIG. 4A) set by the system administrator, will not be adhered to. For example, since the Class C threads are the only threads in the run queue associated with $CPU_1$ 650, they will receive 50% of the processing time of the system. Clearly, this is quite above the 10% that they are allowed to receive. One method of ensuring that they do not receive any more processing time than they are allowed is to have another class of threads in the run queue. This then will promote competition between the two classes of threads. Indeed, the ideal distribution of threads is to have each run queue contain threads from all three different classes.

One method of ensuring that established use-policies are being adhered to is to periodically check each run queue to determine whether there are at least two different classes of threads therein (i.e., a higher and a lower priority class). If not, then a thread of a different class, with a higher class priority than the one presently in there, should be placed into the run queue. Furthermore, if despite having these two different classes of threads in the run queue, either one or both classes of threads are still receiving more processing time than allowed to, then a thread from a different class having yet a higher class priority needs to be placed into the run queue.

To check all the threads in the run queues to determine whether they each contain at least two different classes of threads is time-consuming and CPU-intensive. Consequently every 0.1 second, the invention checks a portion of the threads to see whether they are well distributed throughout the run queues. The invention uses the band concept introduced earlier (see FIG. 4B) to determine which portion of the threads to investigate. Specifically, the invention defines a well-balanced system as a system that contains an equal number of threads in a particular band in each run queue. If two class A threads, two class B threads and two class C threads are in the run queue of each of the two processors (see FIG. 6B), the system will be balanced. The system will be balanced because there will be four threads in $band_2$ and two threads in $band_1$ in both run queues.

If the system is not balanced (i.e., if one run queue has more threads in a particular band than the other run queue), threads will be moved from the run queue with the greater number of threads to the one with the lower number of threads in the band. It should be noted that the system is very dynamic. That is at any one time, a thread may be being placed into a run queue while one or more threads may be being processed out of run queues while a class or classes may be moving from one band into another etc. Thus, because of this dynamism, the invention only handles one band at a time and only one thread is moved from one run queue into another when the system is not balanced.

Returning to FIG. 6A, when the invention checks $band_2$, it will find eight (8) threads in that band, but all of them are in the run queue associated with $CPU_0$ 610. Hence, the system will be determined to be imbalanced. Consequently, a thread will be moved from the run queue associated with $CPU_0$ to the run queue associated with $CPU_1$ and the process will end.

Figure 6A:
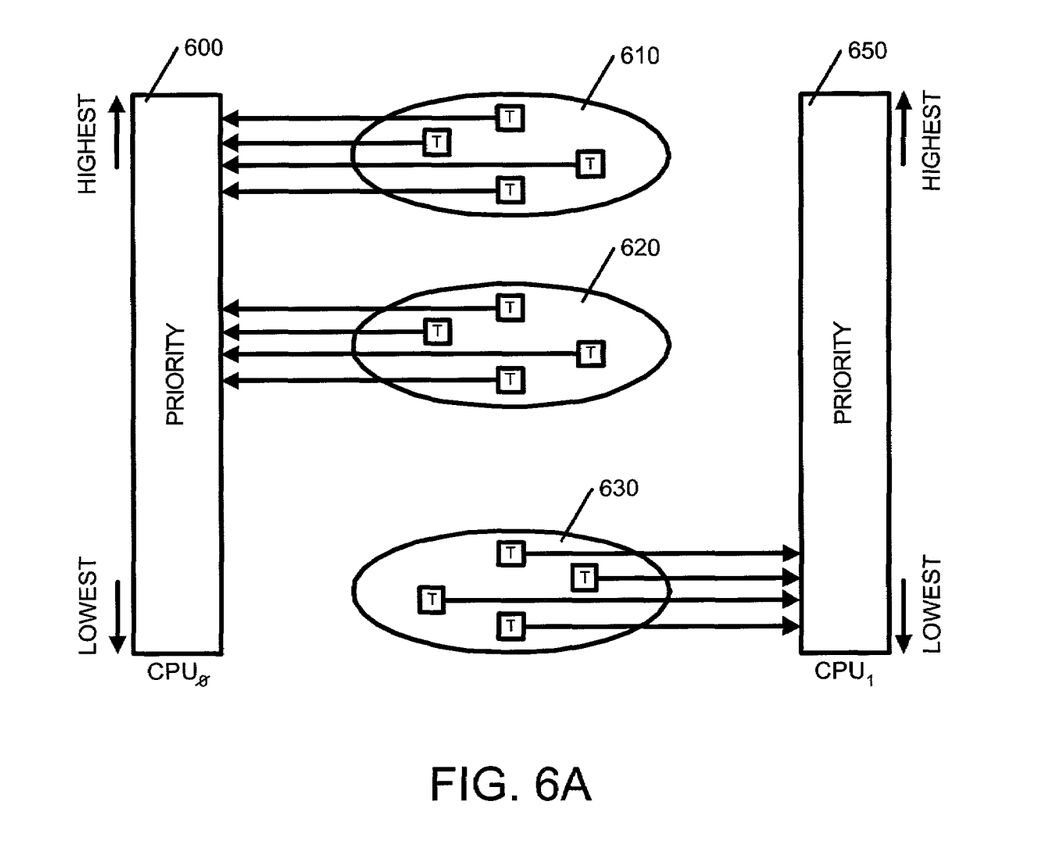
FIG. 6 illustrates run queues of a computer system share by three different groups of users.

In this case, it will not really matter whether the thread moved is a class A or class B thread as both classes are in $band_2$. If the system were balanced and in the process all the class B threads were moved from the run queue associated with $CPU_0$ to the one associated with $CPU_1$, then the class B threads might start getting a lot of processing time (since their class priority is higher than the class C threads). When that happens, their class priority would start being reduced. If it is reduced enough to where their class priority now falls into $band_1$, the system would again become imbalanced. At that point, class A threads would be moved from one run queue to another to rebalance the system.

After balancing $band_2$, $band_1$ will be scrutinized. In this case, the system would be found to be imbalanced since all the class C threads, (note that class C is the only class in $band_1$) are in the run queue associated with $CPU_1$. Consequently, class C threads will be moved one at a time until both run queues contain an equal number of class C threads.

Figure 6B:
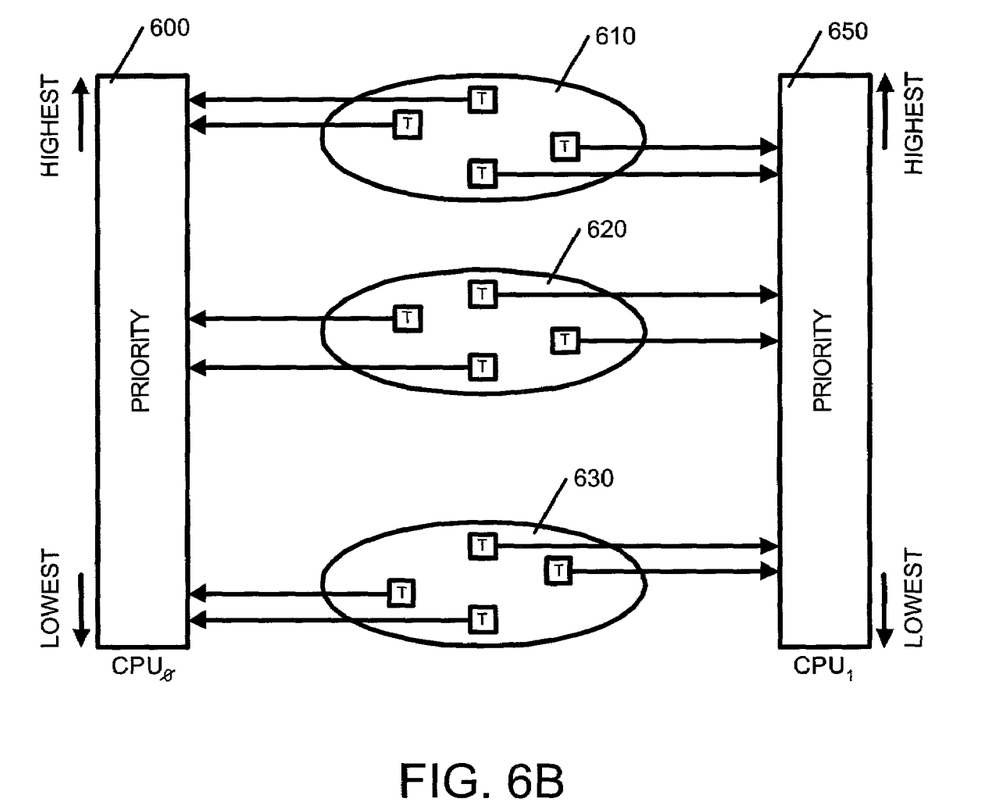

In our example, an ideal thread distribution is that shown in FIG. 6B. In FIG. 6B, each run queue contains an equal number of threads from each class. Thus, assuming that threads are not being placed into the run queues nor are being processed out of the run queues, the system will always remain balanced. If a class moves from one band to another, all the threads in that class will make that migration. Hence, the system will continue to remain balanced.

Figure 7:
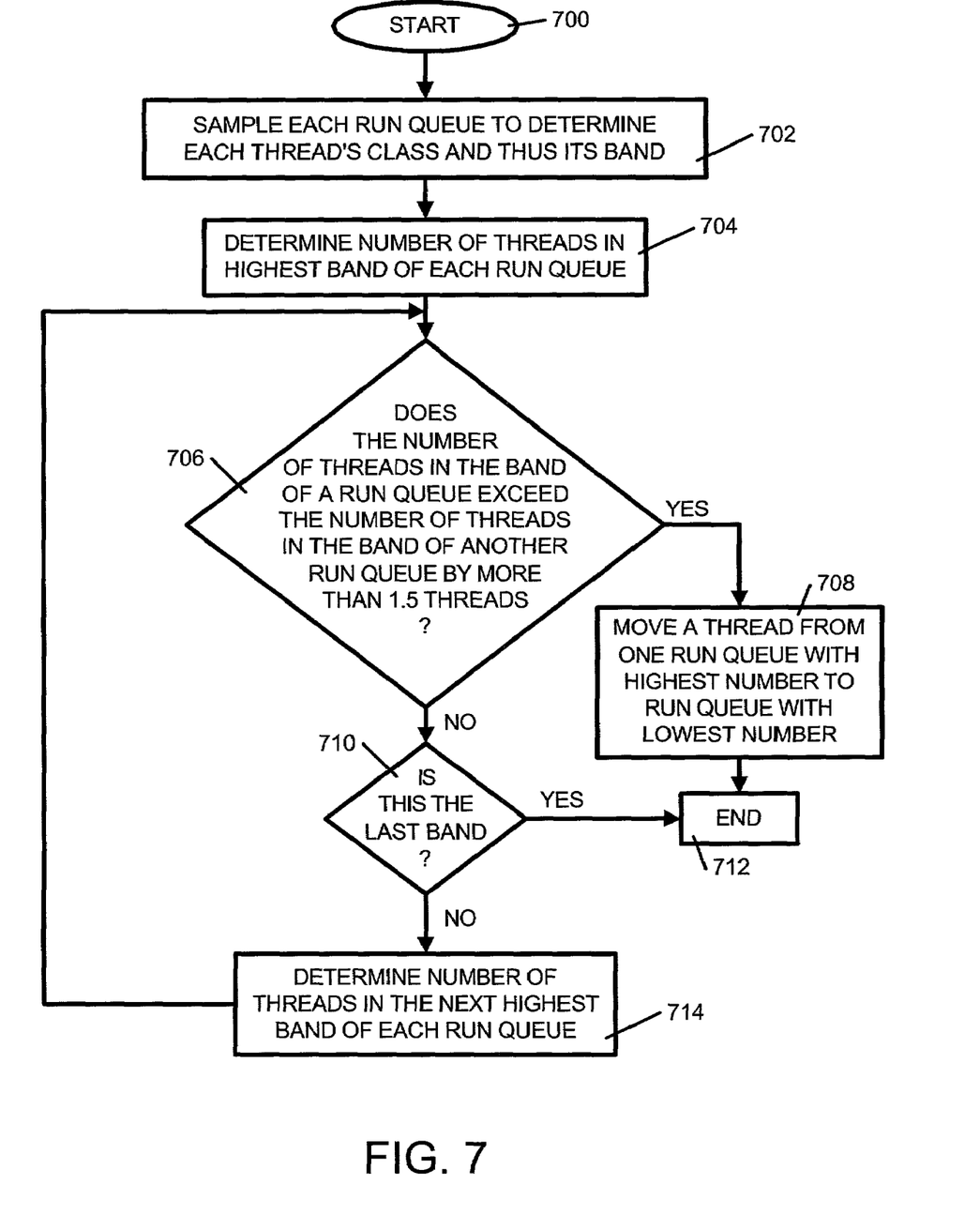
FIG. 7 is a flow chart of a software program that may be used to implement the invention.

FIG. 7 is a flow chart of a software program that may be used in implementing the invention. The software program starts when the computer system is turned on or is reset (step 700). The program monitors the number of threads in each class in each run queue. The program does so by sampling the run queues 100 times per second to obtain an average number of threads in each class in each run queue. Then every 0.1 second, the process uses the thread classes to determine whether the number of threads in the highest band (e.g., $band_2$) of one run queue is on the average greater than the number of threads in the same band (i.e. $band_2$) of the other run queue by more than 1.5 threads. If so, the system is deemed to be imbalanced. The process will try to balance the system by moving a thread from the run queue with the highest number of threads in the band to the run queue with the lowest number of threads.

As mentioned before, because the system is very dynamic, the process will not ensure that the system is indeed balanced (i.e., the process will not make sure that an equal number of threads exists in the band in each run queue). Furthermore, because it is time-consuming and CPU-intensive to ensure that the system is balanced in the point of view of all the bands, the process will end there.

Thus, the process always starts with the highest band. If the highest band is not balanced, the process will attempt to balance the band and end there. If the highest band is balanced, the process will then investigate the next highest band. Each band will be investigated, going from the highest to the lowest, until the number of threads in one run queue is higher by more than 1.5 threads than the number of threads of another run queue. When that occurs, a thread will be moved from the run queue with the highest number of threads to the run queue with the lowest number of threads and the process will end. If the number of threads in all the bands of all the run queues is equal, the process will end without moving any thread from one queue to another (steps 700–714).

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of load-balancing a multi-processor system, said system including at least a first and a second processor run queues, the first and the second processor run queues for holding threads to be processed, the method comprising the steps of:

dividing the first and the second processor run queues each into a plurality of priority bands, each band in the first processor run queue being similar to each band in the second processor run queue;

assigning a priority to each created thread and placing the created thread into either the first processor run queue or the second processor run queue, the assigned priority categorizing the created thread into one of the plurality of priority bands;

determining whether the system is load-imbalanced, the system being load-imbalanced if there are more threads classified into one priority band of the first processor run queue than there are threads classified in a similar priority band of the second processor run queue; and load-balancing the system, if the system is load-imbalanced, by moving threads from the one priority band of the first processor run queue to the similar priority band of the second processor run queue.

2. The method of claim 1 wherein threads in the first processor run queue and in the second processor run queue are organized by classes.

3. The method of claim 2 wherein a thread belongs to a class based on a user of the multi-processor system to whom it belongs.

4. The method of claim 3 wherein the assigned priority is a priority of the class to which the thread belongs.

5. The method of claim 4 wherein as threads of a class are processed the class priority is reduced and as threads of class are not processed as much as allowed the class priority is increased.

6. The method of claim 5 wherein a thread may be reclassified into another priority band as the class priority is reduced or increased.

7. The method of claim 1 wherein the system is load-imbalanced if the number of threads in a priority band of the first processor run queue exceeds the number of threads in a similar priority band of the second processor run queue by more than a predetermined number.

8. A computer program product on a computer readable medium for load-balancing a multi-processor system, said system including at least a first and a second processor run queues, the first and the second processor run queues for holding threads to be processed, the computer program product comprising:

code means for dividing the first and the second processor run queues each into a plurality of priority bands, each band in the first processor run queue being similar to each band in the second processor run queue;

code means for assigning a priority to each created thread and placing the created thread into either the first processor run queue or the second processor run queue, the assigned priority categorizing the created thread into one of the plurality of priority bands;

code means for determining whether the system is load-imbalanced, the system being load-imbalanced if there are more threads classified into one priority band of the first processor run queue than there are threads classified in a similar priority band of the second processor run queue; and code means for load-balancing the system, if the system is load-imbalanced, by moving threads from the one priority band of the first processor run queue to the similar priority band of the second processor run queue.

9. The computer program product of claim 8 wherein threads in the first processor run queue and in the second processor run queue are organized by classes.

10. The computer program product of claim 9 wherein a thread belongs to a class based on a user of the multi-processor system to whom it belongs.

11. The computer program product of claim 10 wherein the assigned priority is a priority of the class to which the thread belongs.

12. The computer program product of claim 11 wherein as threads of a class are processed the class priority is reduced and as threads of class are not processed as much as allowed the class priority is increased.

13. The computer program product of claim 12 wherein a thread may be reclassified into another priority band as the class priority is reduced or increased.

14. The computer program product of claim 8 wherein the system is load-imbalanced if the number of threads in a priority band of the first processor run queue exceeds the number of threads in a similar priority band of the second run processor queue by more than a pre-determined number.

15. An apparatus for load-balancing a multi-processor system, said system including at least a first and a second processor run queues, the first and the second processor run queues for holding threads to be processed, the apparatus comprising:

means for dividing the first and the second processor run queues each into a plurality of priority bands, each band in the first processor run queue being similar to each band in the second processor run queue;

means for assigning a priority to each created thread and placing the created thread into a either the first run queue or the second processor run queue, the assigned priority categorizing the created thread into one of the plurality of priority bands;

means for determining whether the system is load-imbalanced, the system being load-imbalanced if there are more threads classified into one priority band of the first processor run queue than there are threads classified in a similar priority band of the second processor run queue; and means for load-balancing the system, if the system is load-imbalanced, by moving threads from the one priority band of the first processor run queue to the similar priority band of the second processor run queue.

16. The apparatus of claim 15 wherein threads in the first processor run queue and in the second processor run queue are organized by classes.

17. The apparatus of claim 16 wherein a thread belongs to a class based on a user of the multi-processor system to whom it belongs.

18. The apparatus of claim 17 wherein the assigned priority is a priority of the class to which the thread belongs.

19. The apparatus of claim 18 wherein as threads of a class are processed the class priority is reduced and as threads of class are not processed as much as allowed the class priority is increased.

20. The apparatus of claim 19 wherein a thread may be reclassified into another priority band as the class priority is reduced or increased.

21. The apparatus of claim 15 wherein the system is load-imbalanced if the number of threads in a priority band of the first processor run queue exceeds the number of threads in a similar priority band of the second processor run queue by more than a pre-determined number.

22. A multi-processor system being able to self load-balance, said system including at least a first and a second processor run queues, the first and the second processor run queues for holding threads to be processed, the system comprising:

at least one storage system for storing code data; and at least one processor for processing the code data to divide the first and the second processor run queues each into a plurality of priority bands, each band in the first processor run queue being similar to each band in the second processor run queue, to assign a priority to each created thread and to place the created thread into either the first processor run queue or the second processor run queue, the assigned priority categorizing the created thread into one of the plurality of priority bands, to determine whether the system is load-imbalanced, the system being load-imbalanced if there are more threads classified into one priority band of the first processor run queue than there are threads classified in a similar priority band of the second processor run queue, and to load-balance the system, if the system is load-imbalanced, by moving threads from the one priority band of the first processor run queue to the similar priority band of the second processor run queue.

23. The multi-processor system of claim 22 threads in the first processor run queue and in the second processor run queue are organized by classes.

24. The multiprocessor system of claim 23 wherein a thread belongs to a class based on a user of the multi-processor system to whom it belongs.

25. The multi-processor system of claim 24 wherein the assigned priority is a priority of the class to which the thread belongs.

26. The multi-processor system of claim 25 wherein as threads of a class are processed the class priority is reduced and as threads of class are not processed as much as allowed the class priority is increased.

27. The multi-processor system of claim 26 wherein a thread may be reclassified into another priority band as the class priority is reduced or increased.

28. The multi-processor system of claim 22 wherein the system is load-imbalanced if the number of threads in a priority band of the first processor run queue exceeds the number of threads in a similar priority band of the second run processor queue by more than a pre-determined number.

* * * * *